United States Patent [19]
Schoeffel et al.

[11] Patent Number: 5,890,659
[45] Date of Patent: Apr. 6, 1999

[54] VALVE CLOSING BODY AND PROCESS AND DEVICE FOR PRODUCING SEALING SEATS ON VALVE CLOSING BODIES

[75] Inventors: Eberhard Schoeffel, Bamberg; Peter Land, Pettstadt; Josef Seidel, Breitenguessbach, all of Germany

[73] Assignee: Robert Bosch GmbH, Stuttgart, Germany

[21] Appl. No.: 860,449

[22] PCT Filed: Aug. 10, 1996

[86] PCT No.: PCT/DE96/01502

§ 371 Date: Jun. 26, 1997

§ 102(e) Date: Jun. 26, 1997

[87] PCT Pub. No.: WO97/20659

PCT Pub. Date: Jun. 12, 1997

[30] Foreign Application Priority Data

Dec. 5, 1995 [DE] Germany .................. 195 45 333.6

[51] Int. Cl.$^6$ .................................................. B24B 15/04
[52] U.S. Cl. ...................... 239/533.2; 451/36; 451/115
[58] Field of Search .................... 239/533.2, 533.3; 451/115, 36, 49, 246, 397

[56] References Cited

U.S. PATENT DOCUMENTS 5,315,792  5/1994  Schweizer et al. .................. 51/317

FOREIGN PATENT DOCUMENTS 2029508  3/1980  United Kingdom ............... 239/533.2

*Primary Examiner*—Andres Kashnikow
*Assistant Examiner*—Jorge S. Bocanegra
*Attorney, Agent, or Firm*—Edwin E. Greigg; Ronald E. Greigg

[57] ABSTRACT

A new process in which a valve closing body is produced with a predetermined inclination in relation to a longitudinal tool axis. The valve closing body is set in rotation and thereby carries out a precessing motion so that the tool body that rests against the sealing seat produces a narrow ball zone that always assures a sealing contact between the sealing seat and the valve seat face, even when a valve closing body is guided in the valve with guidance play. The process and the device are particularly suited for machining sealing seats on valve closing bodies of fuel injection valves for fuel injection systems of internal combustion engines.

16 Claims, 3 Drawing Sheets

5,890,659

VALVE CLOSING BODY AND PROCESS AND DEVICE FOR PRODUCING SEALING SEATS ON VALVE CLOSING BODIES

PRIOR ART

The invention is based on a valve closing body, a process and a device as set forth hereinafter. DE 39 25 043 A1 has already disclosed a valve closing body, a process, and a device for carrying out the process, wherein according to the process, the valve closing body is brought into contact with the valve seat face of the valve seat body and is set into a rotational movement and an oscillation movement that acts parallel to the rotational axis with high frequency transmitted to the valve seat body and the valve closing body. Surfaces with very high surface quality are in fact produced, but when the longitudinal closing body axis is tilted in relation to the longitudinal valve seat axis, it is not guaranteed that a sufficient seal is still produced. For an ideal sealing of the valve closing body against the valve seat face of the valve seat body of the valve, it is necessary that the shape of the sealing seat of the valve closing body and the shape of the valve seat body are as favorably close to circular as possible along the sealing line at which the sealing seat of the valve closing body touches the valve seat face of the valve seat body. However, since the valve closing body can never be so precisely guided that its longitudinal closing body axis coincides identically with the longitudinal valve seat axis, that is, a certain guidance play always leads to a tilted position of the valve closing body in relation to the longitudinal valve seat axis, in order to achieve the ideal circular shape along the sealing line inside the contact zone between the valve closing body and the valve seat body, the sealing seat on the valve closing body has to be embodied as ball-shaped.

ADVANTAGES OF THE INVENTION

The valve closing body according to the invention has the advantage that the valve is permitted to be shut off by means of a narrow sealing seat, even if the valve closing body is imprecisely guided in the valve. In a simple manner, the process according to the invention, which is for manufacturing sealing seats on valve closing bodies, and the device according to the invention, which is for carrying out the process for manufacturing sealing seats on valve closing bodies, permit the production of ideal, rotationally symmetrical sealing seats in the form of a ball zone.

Advantageous improvements and updates of the process and device disclosed are possible by means of the measures taken.

It is particularly advantageous to generate the compressive force on the valve closing body by means of compressed air and thus to produce the compressive force of the valve closing body against the tool body in a contact-free manner that generates no wear and tear.

It is likewise advantageous to generate the high-speed rotation of the valve closing body by means of compressed air directed at the valve closing body, that is in a contact-free manner that generates no wear and tear.

BRIEF DESCRIPTION OF THE DRAWINGS

Exemplary embodiments of the invention are represented in a simplified fashion in the drawings and are explained in detail in the subsequent description.

DESCRIPTION OF THE EXEMPLARY EMBODIMENTS

Figure 1:
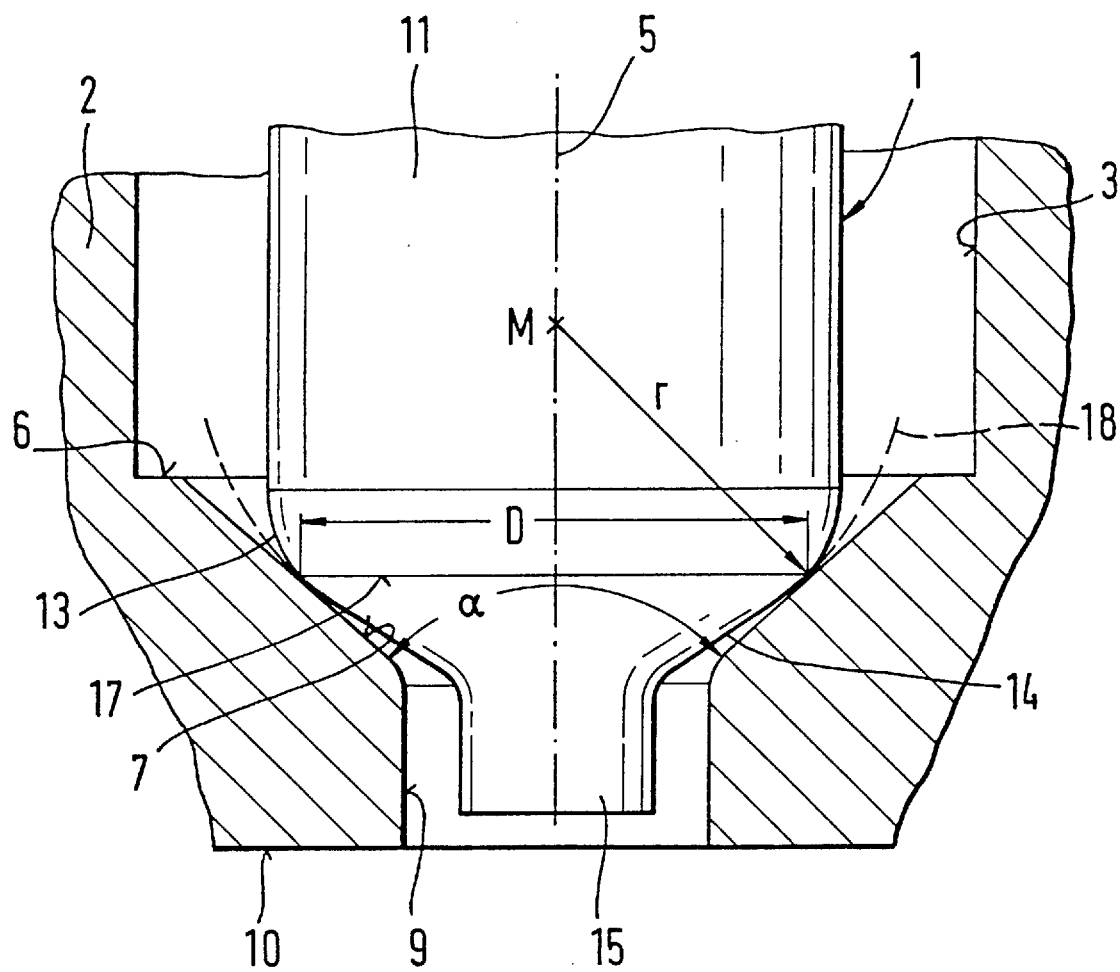
FIG. 1 shows a valve closing body embodied according to the invention, in the form of a valve needle, partially shown, resting against a valve seat face of a valve seat body.

In FIG. 1, the reference numeral 1 indicates a partially represented valve closing body in the form of a valve needle, as is used in known fuel injection valves for fuel injection systems of internal combustion engines with externally supplied ignition. As disclosed for example in DE 39 25 043 A1, the valve closing body is guided in a valve seat body 2 in a guide bore 3 and can be slid axially along a longitudinal closing body axis 5. In the partial section of the valve shown in FIG. 1, viewed in terms of flow direction, the guide bore 3 transitions via a step 6 into a valve seat face 7 that tapers conically and is adjoined on the downstream end by a cylindrical injection opening 9, which ends at a bottom face 10 of the valve seat body 2. The needle-shaped valve closing body has a cylindrically embodied valve shaft 11 that is rotationally symmetrical in relation to the longitudinal closing body axis 5. The valve shaft is adjoined by for example a rounded transition section 13 and that is adjoined to the downstream side by a tapering conical section 14, which transitions into a cylindrical valve pin 15, which protrudes into the injection opening 9. The contact line between the transition section 13, which is embodied as rounded, and the conical section 14 constitutes the sealing seat 17, which runs perpendicular to the longitudinal closing body axis 5 and in the ideal case, represents the line that is embodied as a circle and with which the valve closing body rests sealingly against the valve seat face 7 when the valve is closed. According to the invention, the sealing seat 17 is embodied as a narrow ball zone with a radius r=D/2 cos α/2 around the center point M on the longitudinal closing body axis 5. D signifies the diameter of the sealing seat 17 perpendicular to the longitudinal closing body axis 5 and α signifies the taper angle of the valve seat face 7. A hypothetical circle 18 with the radius r around the center point M, whose ball zone is constituted by the sealing seat 17 is shown in dashed lines. The ball zone has a height of approx. 20 to 100 μm in the direction of the longitudinal closing body axis 5. The taper angle of the conical section 14 is greater than the taper angle α enclosed by the conical valve seat face 7.

Figure 2:
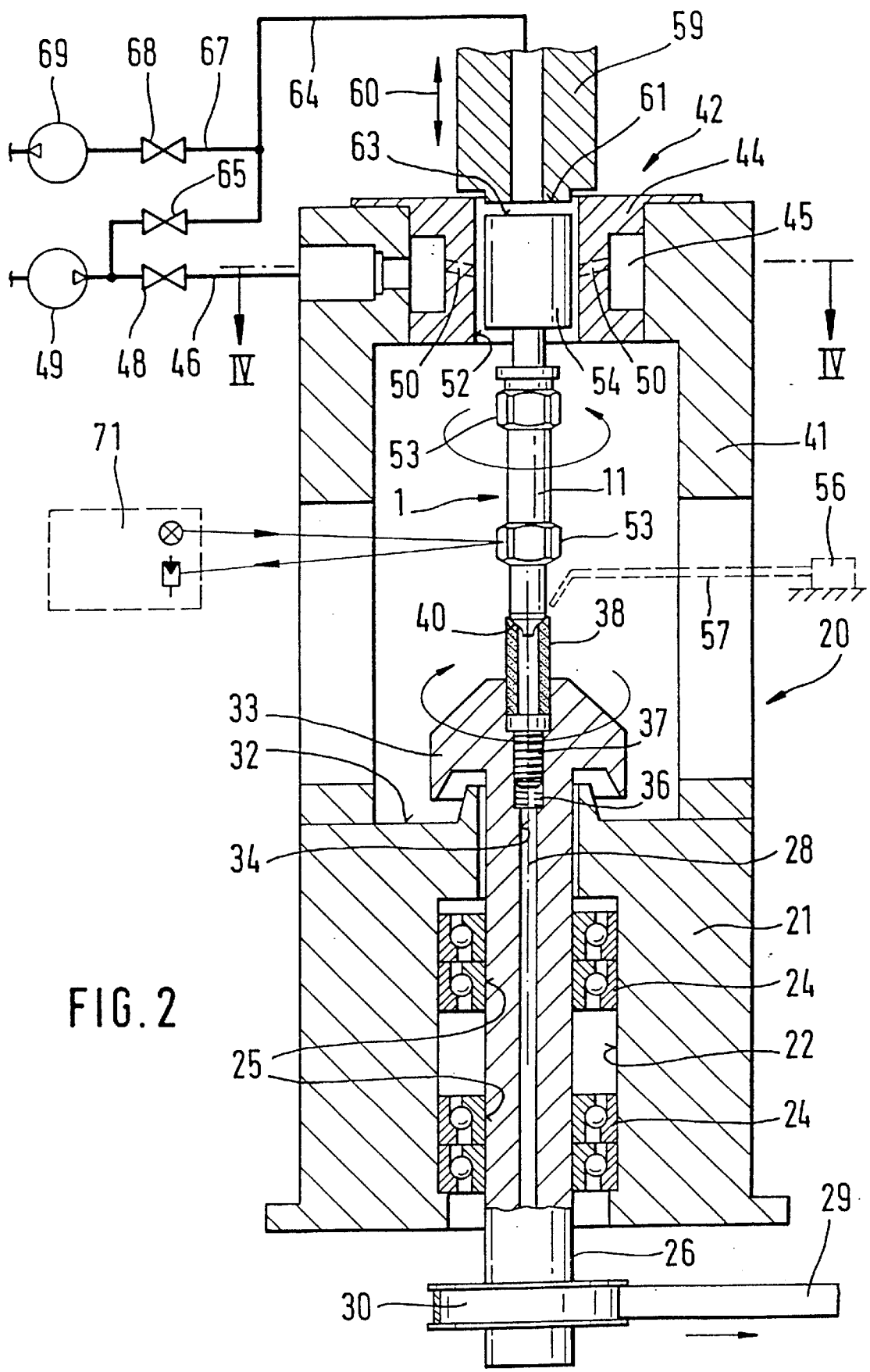
FIG. 2 is a simplified representation of a device according to the invention for producing a valve closing body according to the invention and according to FIG. 1.

FIG. 2 schematically represents a device for producing ideal, rotationally symmetrical sealing seats on valve closing bodies, e.g. the one shown in FIG. 1. The device according to FIG. 2 has a securing component 20, which has a base body 21. The base body 21 is penetrated by a vertically extending, stepped through bore 22 in which roller bearings 24 are disposed. A tubular tool receiving body 26 is press-fitted into the internal bore 25 of each roller bearing 24; this tool receiving body 26 extends through the through bore 22 of the base body 21 and is supported by the roller bearing 24 in a play free manner so that it can rotate around a vertically extending longitudinal tool axis 28. The rotation of the tool receiving body 26 is carried out as indicated, for example by means of a belt drive 29, which engages the tool receiving body 26 via a pulley 30 and sets it into rotation. The drive of the tool receiving body 26 could also occur in a different manner, for example by means of an electromotor, not shown, and by means of a step-up or step-down gear.

On its end remote from the belt drive 29, the base body 21 has a bearing face 32, which a clamping end 33 of the tool receiving body 26 rises above. Concentric to the longitudinal tool axis 28, a longitudinal bore 34 extends through the tool receiving body 26 and in the region of the clamping end 33, this longitudinal bore has an internal thread 36, into which a threaded shaft of a tool carrier 37 is screwed, which shaft is provided with an external thread. In addition to the threaded shaft, the tool carrier 37 has a head on which a tool body 38 is mounted and is fastened by means of glue, for example. The tool body 38 is embodied as tubular and extends in the axial direction along the longitudinal tool axis 28, wherein it protrudes, for example partway into the clamping end 33 and can be rotated in a play free manner with the tool receiving body 26. On its end remote from the tool carrier 37, the tool body 38 has a machining surface 40 that tapers conically toward its hollow interior and its taper angle corresponds to the taper angle of the valve seat 7 in FIG. 1.

Figure 4:
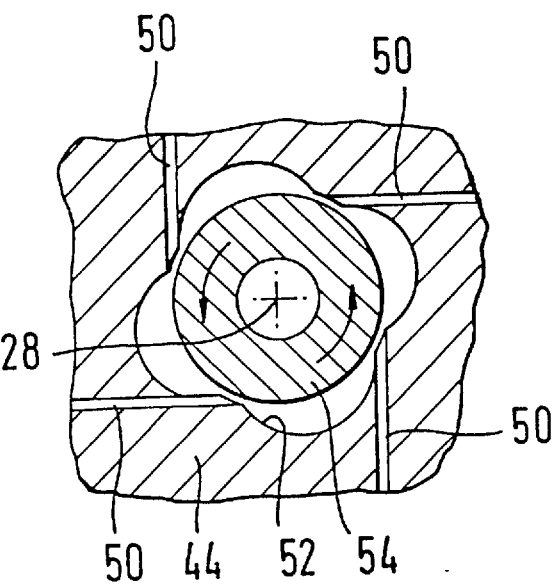
FIG. 4 is a section along the line IV—IV in FIG. 2.

At least one securing bracket 41 is mounted on the bearing face 32 of the base body 21 and fastened to it. The securing bracket 41 holds a rotating subassembly 42 spaced axially apart from the base body 21, which subassembly has an air nozzle body 44, for example, which is disposed coaxial to the longitudinal tool axis 28. A circumferential air conduit 45 is embodied on the air nozzle body 44, extends for example on the circumference, is covered by the retaining bracket 41, and communicates with a compressed air line 46. The compressed air line 46 can be shut off by means of a first compressed air shut-off valve 48 or can be connected to a compressed air pump 49 or another source of compressed air. Air nozzles 50 lead from the air conduit 45 of the air nozzle body 44 in the radial direction, horizontally or diagonally toward the longitudinal tool axis 28 and, as shown in FIG. 4, these nozzles run past the longitudinal tool axis 28 and offset from it. The air nozzles 50 leading from the air conduit 45 feed into an air drive chamber 52 enclosed in the radial direction by the air nozzle body 44.

Figure 3:
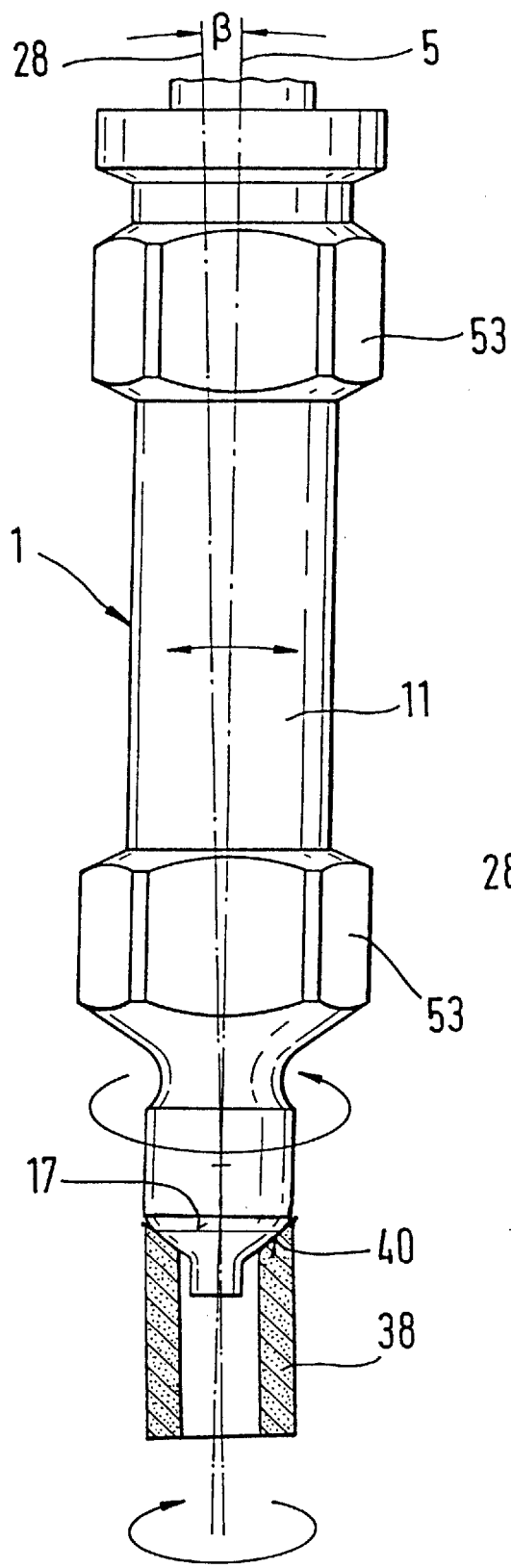
FIG. 3 is a partial representation of a valve closing body embodied according to the invention, resting against a tool according to FIG. 2.

The valve closing body 1 is guided axially through the air drive chamber 52 and with its sealing seat 17, as is shown in FIG. 3 in a different scale, the valve closing body touches the machining face 40 of the tool body 38. In a known manner, guide sections 53 are embodied on the valve shaft 11, which slide in the guide bore 3 of the valve seat body 2 and thereby guide the valve closing body 1 in the radial direction. With electromagnetically actuated valves, a cylindrical armature 54 is connected to the end of the valve shaft 11 remote from the sealing seat 17 and, when the valve closing body is inserted into the device, protrudes into the air drive chamber 52 with play; this armature is struck for example in an approximately tangential direction on its circumference by the air jets coming out of the air nozzles 50 and is driven at high speeds in a rotation counter to that of the tool body 38. In FIG. 4, four air nozzles 50 are shown, which are spaced equidistantly apart from one another, but this can also be two or three or more than four air nozzles, which are directed at the armature 54. The air nozzles 50 do not absolutely have to be directed at the armature 54; they can just as well be disposed at another location in the axial expanse of the valve closing body 1 and can direct air jets at it. The tool body 38, which for example is comprised of extremely fine-grained corundum, can be wetted with liquid, for which purpose a liquid supplying device 56 is used, which in FIG. 2 is depicted with dashed lines and supplies liquid to the machining surface 40 via a liquid line 57.

Above the rotating subassembly 42, an aerodynamic force body 59 is disposed on the securing component 20 and is supported so that it can move up and down along the longitudinal tool axis 28, as is indicated by a bidirectional arrow 60. An end face 61 of the aerodynamic force body extends horizontally like an armature end face 63 and is directed toward it. An air line 64 that passes through the aerodynamic force body 59 leads from the end face 61 of the aerodynamic force body to a second compressed air shut-off valve 65. A vacuum line 67, in which a vacuum shut-off valve 68 is disposed, is connected to the air line 64 between the aerodynamic force body 59 and the second compressed air shut-off valve 65. The vacuum shut-off valve 68 permits or cuts off the communication of the vacuum line 67 with a suction pump 69. In order to insert the valve closing body 1 into the device and thereby onto the tool body 38 or to remove the valve closing body 1 from the device, the second compressed air valve 65 is closed and the vacuum shut-off valve 68 is opened so that the suction pump 69 generates a vacuum via he vacuum line 67 and the air line 64 as soon as the aerodynamic force body 59 rests with its end face 61 against the armature end face 63. The pressure difference between the atmospheric pressure acting on the valve closing body 1 with the armature 54 and the vacuum in the air line 64 achieves the fact that the valve closing body 1 is held against the aerodynamic force body 59 and with a downward motion of the aerodynamic force body 59, can be placed upon the tool body 38 and with an upward motion of the aerodynamic force body 59, can be lifted up from the tool body 38. The change of the individual valve closing body 1 to be machined occurs in this manner. As soon as the valve closing body 1 is placed on the tool body 38, the vacuum shut-off valve 68 is closed. Then the second compressed air shut-off valve 65 is opened and the air line 64 is connected to the compressed air pump 49 so that an excess pressure is built up in the air line 64, whose compressive force on the armature end face 63 leads to a compressive force acting in the direction toward the tool body 38. Between the end face 63 of the armature and the end face 61 of the aerodynamic force body, there is a small axial spacing by which the aerodynamic force body 59 is guided upward so that these two bodies are in contactless opposition. The actuation of the first compressed air shut-off valve 48, the second compressed air shut-off valve 65, and the vacuum shut-off valve 68 is carried out for example electromagnetically or by means of a control medium such as air or oil.

To carry out the process, the radial guidance of the armature 54 in the air drive chamber 52 is embodied with play in such a way that the longitudinal closing body axis 5 runs inclined at an angle $\beta$, which is approximately between 10' and 80', in relation to the vertically aligned longitudinal tool axis 28. The inclination of the longitudinal closing body axis 5 in relation to the longitudinal tool axis 28 thereby embodies a precessing motion when the valve closing body 1 is rotated, by means of which the tool body 38, which is comprised of a fine-grained corundum material, machines the sealing seat 17 into the form of a ball zone in accordance with the explanations of FIG. 1, at an axial height of approx. 10 to 100 $\mu$m. The embodiment of the sealing seat 17 as a narrow ball zone assures that when installed in the valve, the valve closing body 1 always rests sealingly against the valve seat face 7 of the valve seat body 2, despite the guidance play that always exists.

The rotation of the valve closing body 1 can be monitored by means of a motion sensor 71 represented in FIG. 2 with dashed lines. The motion sensor 71 is embodied for example as an optical sensor, having a light source that transmits beams of light onto a guide section 53 of the valve closing body 1 and a photosensitive element that captures the light beams reflected by the guide section 53, for example a photodiode. Other motion sensors 71 can also be used, which function for example inductively or with magnets.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A valve closing body for fuel injection valves of internal combustion engines, having a longitudinal closing body axis, a valve shaft, a transition section between the valve shaft and a conical section and a rotationally symmetrical sealing seat that is disposed on a contact line between the transition section and the conical section, the sealing seat (17) is embodied as a narrow ball zone with a radius r=D/2 cos α/2, wherein D is a diameter of the sealing seat (17) perpendicular to a longitudinal closing body axis (5) and α is a taper angle of a conical valve seat face (7), which cooperates with the sealing seat (17).

2. A process for manufacturing ideal, rotationally symmetrical sealing seats on valve closing bodies for fuel injection valves of internal combustion engines, wherein the sealing seat of the valve closing body is brought into contact with a tool body and the valve closing body and the tool body are set into a rotational movement, respectively around a longitudinal closing body axis and around a longitudinal tool axis in relation to each other, and said tool body and said valve closing body are acted upon with a compressive force toward one another, inclining the longitudinal closing body axis (5) in relation to the longitudinal tool axis (28) in such a way that the valve closing body (1) carries out a precessing motion.

3. The process according to claim 2, which comprises generating the compressive force by means of compressed air directed at the valve closing body (1).

4. The process according to claim 2 which comprises rotating the valve closing body (1) and the tool body (38) in opposite directions.

5. The process according to claim 3 which comprises rotating the valve closing body (1) and the tool body (38) in opposite directions.

6. The process according to claim 2, which comprises rotating said valve closing body (1) at a high speed rotation by means of compressed air directed onto its circumference at an angle.

7. The process according to claim 3, which comprises rotating said valve closing body (1) at a high speed rotation by means of compressed air directed onto its circumference at an angle.

8. The process according to claim 4, which comprises rotating said valve closing body (1) at a high speed rotation by means of compressed air directed onto its circumference at an angle.

9. The process according to claim 2, which comprises disposing the tool body (38) vertically, and placing the valve closing body (1) on the tool body (38) from above.

10. The process according to claim 3, which comprises disposing the tool body (38) vertically, and placing the valve closing body (1) on the tool body (38) from above.

11. The process according to claim 4, which comprises disposing the tool body (38) vertically, and placing the valve closing body (1) on the tool body (38) from above.

12. The process according to claim 5, which comprises disposing the tool body (38) vertically, and placing the valve closing body (1) on the tool body (38) from above.

13. A device for manufacturing ideal, rotationally symmetrical sealing seats on valve closing bodies for fuel injection valves on internal combustion engines, having a tool body that is secured in a tool receiving body of a securing component and rotated around a vertical longitudinal tool axis, a rotation device that rotates the valve closing body around a longitudinal closing body axis, a radial guide that engages the valve closing body, and a compressive force that acts on the valve closing body and the tool body toward each other, the radial guide engages with the valve closing body (1) in such a way that the longitudinal closing body axis (5) extends inclined in relation to the vertical longitudinal tool axis (28).

14. The device according to claim 13, which includes means for wetting the tool body (38) with fluid.

15. The device according to claim 13, which comprises a source of compressed air, an aerodynamic force body (59) from which compressed air flows in order to generate said compressive force and this aerodynamic force body is aligned toward the valve closing body (1).

16. The device according to claim 13, which includes a rotating subassembly (42) that includes an air nozzle body (44) which has air nozzles (50) that are offset from the longitudinal closing body axis (5) and are aligned around a circumference of the valve closing body (1), via which nozzles the compressed air emerges, which sets the valve closing body (1) into a high speed rotation disposed counter to the rotation of the tool body (38).

* * * * *